United States Patent
Ni et al.

(10) Patent No.: US 10,573,048 B2
(45) Date of Patent: Feb. 25, 2020

(54) EMOTIONAL REACTION SHARING

(71) Applicant: Oath Inc., New York, NY (US)

(72) Inventors: Bin Ni, Fremont, CA (US); Gregory Davis Choi, Belmont, CA (US); Adam Bryan Mathes, San Mateo, CA (US)

(73) Assignee: Oath Inc., New York, NY (US)

( * ) Notice: Subject to any disclaimer, the term of this patent is extended or adjusted under 35 U.S.C. 154(b) by 0 days.

(21) Appl. No.: 15/218,268

(22) Filed: Jul. 25, 2016

(65) Prior Publication Data
US 2018/0027307 A1 Jan. 25, 2018

(51) Int. Cl.
| | |
|---|---|
| G06T 13/20 | (2011.01) |
| H04N 21/4788 | (2011.01) |
| G06K 9/00 | (2006.01) |
| G06T 13/40 | (2011.01) |
| H04N 21/442 | (2011.01) |

(Continued)

(52) U.S. Cl.
CPC ........ *G06T 13/205* (2013.01); *G06K 9/00248* (2013.01); *G06K 9/00315* (2013.01); *G06T 13/40* (2013.01); *H04N 21/4223* (2013.01); *H04N 21/42203* (2013.01); *H04N 21/44218* (2013.01); *H04N 21/4788* (2013.01); *G06T 2200/08* (2013.01); *G06T 2207/10016* (2013.01); *G06T 2207/30201* (2013.01)

(58) Field of Classification Search
CPC ........... H04N 21/8153; H04N 21/4788; G06K 9/00315; G06T 13/205; G06T 13/40; G06T 2200/08; G06T 2207/10016; G06T 2207/30201; G06T 2219/2008; G06T 2219/2021
See application file for complete search history.

(56) References Cited

U.S. PATENT DOCUMENTS

| | | | |
|---|---|---|---|
| 7,676,369 B2 * | 3/2010 | Fujimoto | G10L 15/22 704/231 |
| 2009/0293079 A1 * | 11/2009 | McKee | G06Q 10/105 725/10 |

(Continued)

OTHER PUBLICATIONS

Seyedarabi, Recognition of six basic facial expressions by feature-points tracking using RBF neural network and fuzzy inference system, 2004 IEEE International Conference on Multimedia and Expo (ICME), pp. 1219-1222.*

*Primary Examiner* — Phuc N Doan
(74) *Attorney, Agent, or Firm* — Cooper Legal Group, LLC

(57) ABSTRACT

One or more computing devices, systems, and/or methods for emotional reaction sharing are provided. For example, a client device captures video of a user viewing content, such as a live stream video. Landmark points, corresponding to facial features of the user, are identified and provided to a user reaction distribution service that evaluates the landmark points to identify a facial expression of the user, such as a crying facial expression. The facial expression, such as landmark points that can be applied to a three-dimensional model of an avatar to recreate the facial expression, are provided to client devices of users viewing the content, such as a second client device. The second client device applies the landmark points of the facial expression to a bone structure mapping and a muscle movement mapping to create an expressive avatar having the facial expression for display to a second user.

18 Claims, 9 Drawing Sheets

(51) Int. Cl.
*H04N 21/422* (2011.01)
*H04N 21/4223* (2011.01)

(56) References Cited

U.S. PATENT DOCUMENTS

| | | | | |
|---|---|---|---|---|
| 2011/0141258 A1* | 6/2011 | Song | G06K 9/00268 | 348/77 |
| 2013/0132203 A1* | 5/2013 | Cheng | G06Q 30/02 | 705/14.58 |
| 2013/0147788 A1* | 6/2013 | Weise | G06T 13/40 | 345/419 |
| 2013/0235045 A1* | 9/2013 | Corazza | G06T 13/40 | 345/473 |
| 2014/0055554 A1* | 2/2014 | Du | H04N 21/4223 | 348/14.07 |
| 2014/0154659 A1* | 6/2014 | Otwell | G09B 5/02 | 434/365 |
| 2014/0189395 A1* | 7/2014 | KP | G06F 1/3231 | 713/320 |
| 2014/0362091 A1* | 12/2014 | Bouaziz | G06T 13/40 | 345/473 |
| 2015/0070351 A1* | 3/2015 | Tarquini | G06T 13/40 | 345/419 |
| 2015/0242679 A1* | 8/2015 | Naveh | H04N 21/262 | 382/100 |
| 2015/0350733 A1* | 12/2015 | Persidis | H04N 21/4758 | 725/24 |
| 2016/0165284 A1* | 6/2016 | Bargagni | H04N 21/2187 | 725/12 |
| 2016/0275341 A1* | 9/2016 | Li | G06T 13/40 | |
| 2017/0019357 A1* | 1/2017 | Lee | G06Q 10/107 | |
| 2017/0031559 A1* | 2/2017 | Lee | G06F 3/0488 | |
| 2017/0036115 A1* | 2/2017 | Barajas Gonzalez | A63F 13/67 | |
| 2017/0041272 A1* | 2/2017 | Chang | H04L 51/063 | |
| 2017/0060231 A1* | 3/2017 | Kim | G06F 3/167 | |
| 2017/0140214 A1* | 5/2017 | Matas | G06K 9/00315 | |
| 2017/0256086 A1* | 9/2017 | Park | G06T 13/40 | |
| 2017/0286752 A1* | 10/2017 | Gusarov | G06T 13/40 | |
| 2018/0089880 A1* | 3/2018 | Garrido | H04N 21/4532 | |
| 2018/0303397 A1* | 10/2018 | Krupat | G06Q 30/0271 | |

* cited by examiner

EMOTIONAL REACTION SHARING

BACKGROUND

Content, such as a video, a live stream, an eSports event, etc., may be distributed to multiple users concurrently. For example, thousands of users may watch a live eSports event pertaining to a soccer game. Users may desire to share their emotional feelings and reactions while viewing the content. In an example, user chat interfaces of a chat room may be provided to the users while viewing the content. In this way, the users may share messages with one another through the chat room. However, the chat room may grow to a significant number of users as more users view the content (e.g., thousands of users may be using the chat room to discuss the live eSports event). Unfortunately, the chat room may become overwhelming to the point that users are unable to have meaningful interactions. Users may be unable to single out and/or participate in a certain conversation because text of the chat room may scroll too fast. Thus, users may become overwhelmed, and the chat room may become useless such as for sharing emotional reactions. Also, the chat room interface may experience performance issues such as lag due to resource strain, such as bandwidth consumption and client device resource consumption, from attempting to keep the chat room interface up-to-date with all the messages being generated by the thousands of users.

In another example, live video streams of users may be captured and displayed to other users for sharing user emotions and reactions to viewing the content. However, a live video stream may consume a significant amount of computing resources and network bandwidth to capture, transmit to other users, and display. Thus, live video streams may be limited to merely a few users. Chat rooms, live video streams, and other sharing techniques of user emotions may be very disruptive to the user experience (e.g., the user may stop watching content in order to type out or select an emotion to share) and resource intensive.

SUMMARY

In accordance with the present disclosure, one or more computing devices and/or methods for emotional reaction sharing are provided. A camera on a client device may be initialized to capture frames of video of a user in response to determining that the user is viewing content (e.g., the user is viewing a presidential inauguration video for which the user desires to share emotional reactions with other users). Frames of the video, such as a first frame, may be evaluated to identify a set of facial features of the user (e.g., a nose, glasses, ears, eyes, mouth, hairline, wrinkles, a mole, etc.). A set of landmark points, representing the set of facial features within the first stream, may be generated (e.g., 5 landmark points may correspond to portions of a mouth, and thus changes in location of the 5 landmark points may be indicative of various emotional reactions such as a smile). The set of landmark points may be sent to a user reaction distribution service (e.g., one or more servers) for identifying a facial expression of the user, based upon the set of landmark points and/or other landmark points of the video captured of the user, for reconstruction and display through client devices of other users viewing the content, such as through a second client device of a second user.

The user reaction distribution service may receive the set of landmark points, a second set of landmark points of the video captured of the user, and/or other landmark points from the user and/or other users. The set of landmark points and the second set of landmark points may be evaluated, using a facial expression recognition algorithm that maps changes in location of landmark points to facial movements indicative of facial expressions, to identify a facial expression of the user while the user is viewing the content. The facial expression (e.g., landmark points used to reconstruct the facial expression upon a model of an avatar, such as a three-dimensional facial model, using a bone structure mapping and a muscle movement mapping) may be sent to the second client device for display to the second user. In an example, facial expressions of a plurality of users may be identified and ranked based upon various metrics such as an expressiveness metric, an interestingness expression metric, a uniqueness metric, a common expression metric, etc. so that a facial expression having a desired rank may be provided to other users.

The second client device may receive the facial expression, of the user viewing the content, while the second user is viewing the content through the second client device. In an example, the facial expression (e.g. landmark points of the facial expression) may be applied to a three-dimensional model of an avatar to generate an expressive avatar having the facial expression. For example, the landmark points may be applied to a bone structure mapping and a muscle movement mapping to create the expressive avatar having the facial expression. In another example, the facial expression (e.g., a label of the facial expression such as crying) may be used to query an expression repository of images, animations, avatars, text, symbols, etc. to identify data indicative of the facial expression for display to the second user (e.g., a crying animation). In another example, the second client device may receive an image, animation, avatar, text, symbol, etc. as the facial expression for display to the second user. In this way, the expressive avatar or the facial expression (e.g., the crying animation) may be displayed to the second user while viewing the content.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
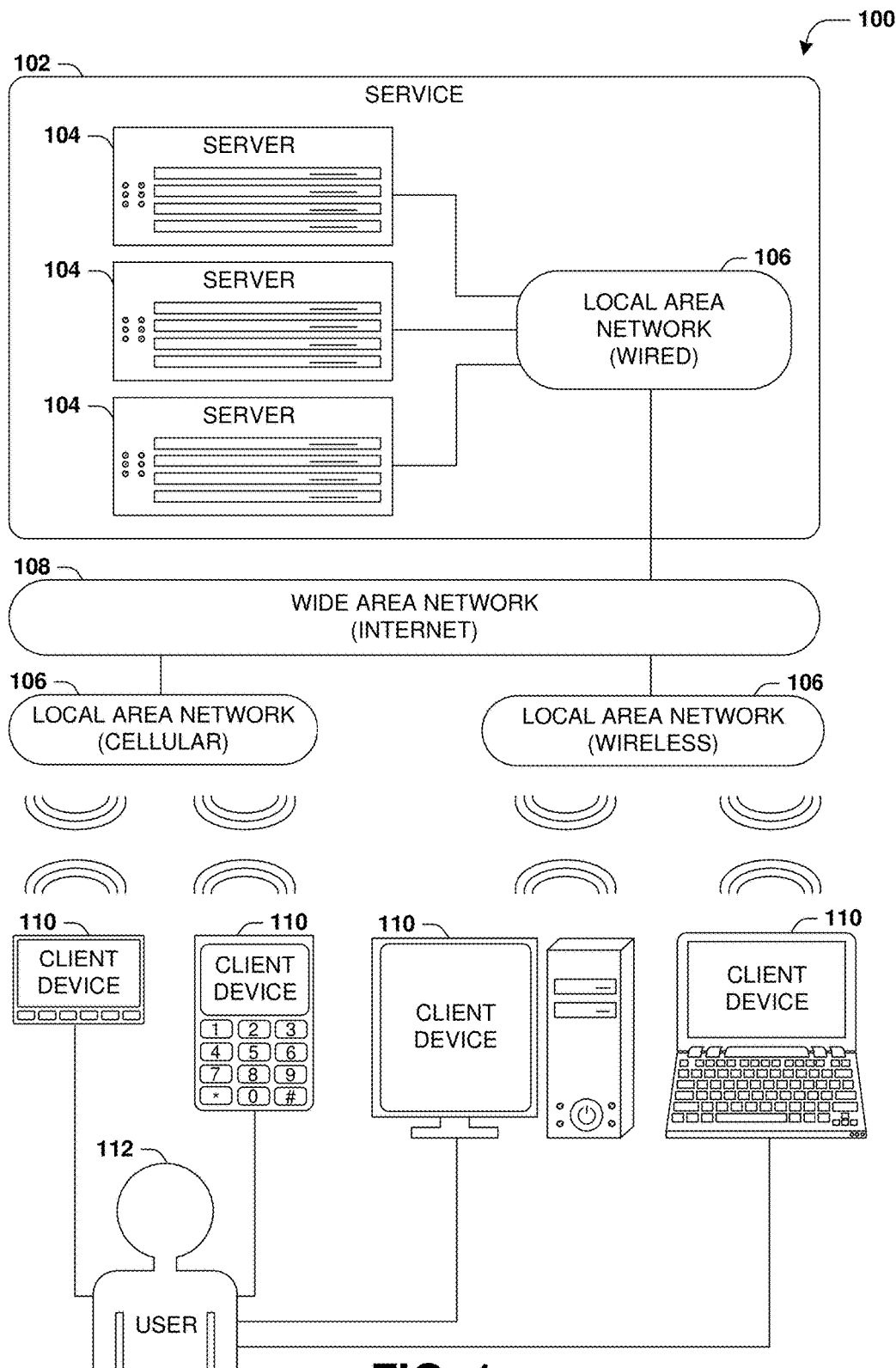
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
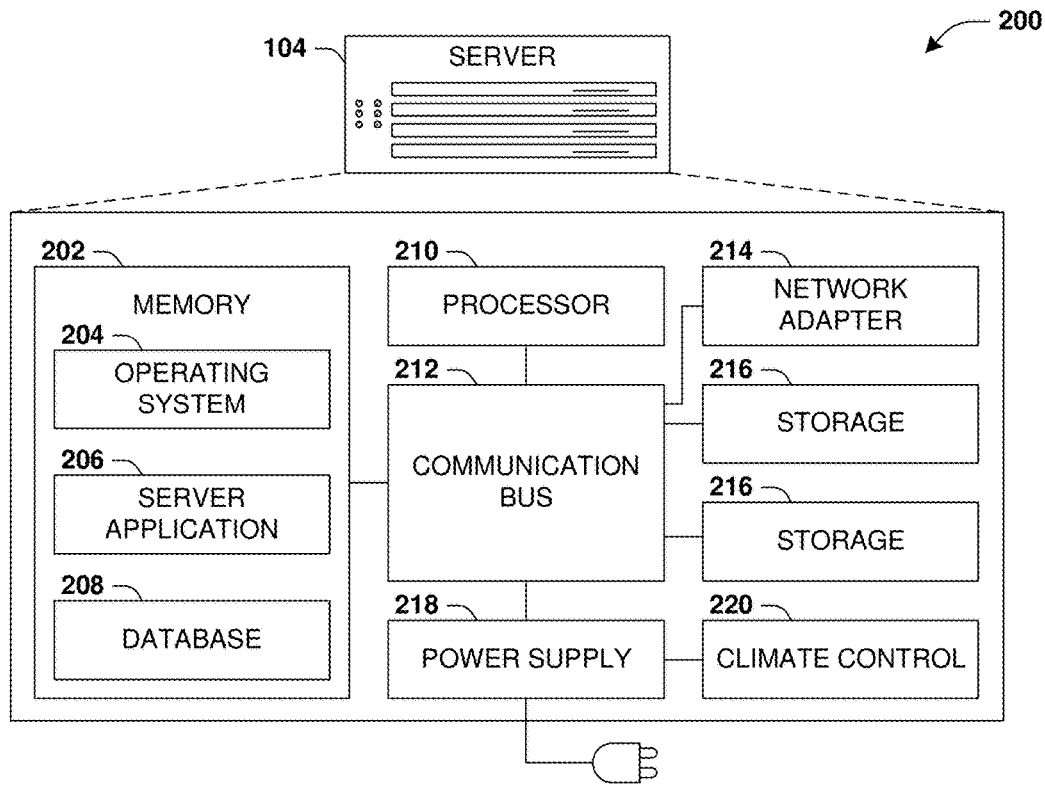
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
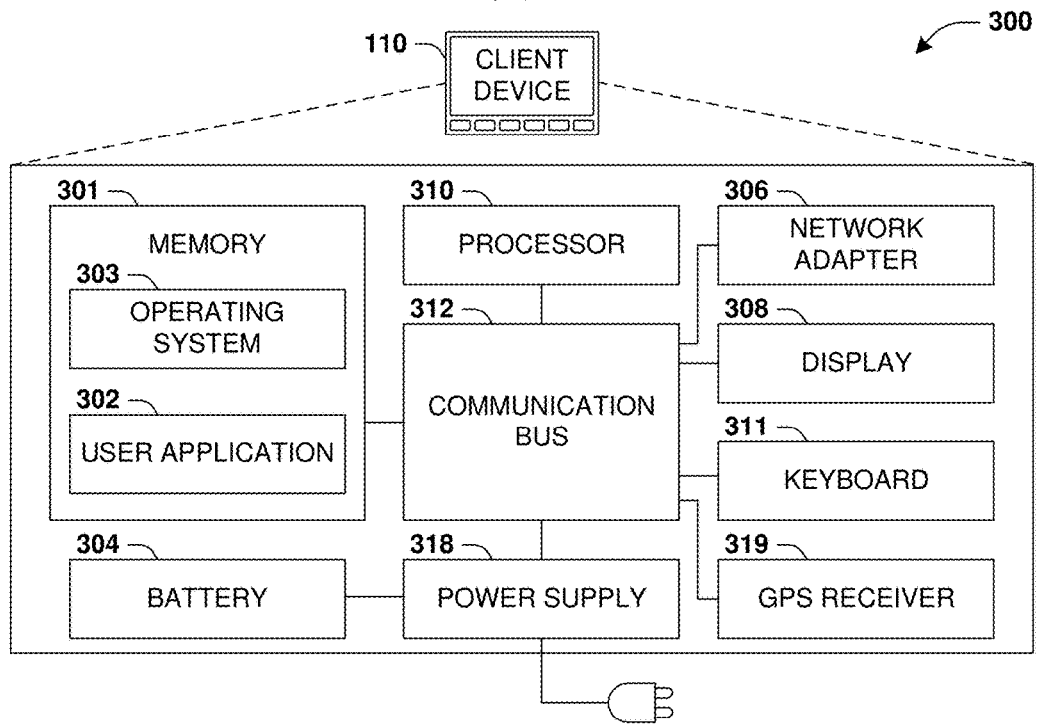
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for emotional reaction sharing are provided. Users, viewing content such as a live stream of a video, may desire to share emotional reactions to the video. In an example, the users may be provided with access to a chat room through which the users can share messages. However, the chat room can become overwhelming and ineffective for communication as more users join the chat room (e.g., thousands of users may be sharing messages so quickly that a user may be unable to decipher individual messages). The chat room is disruptive to the user experience of the content because the user has to stop viewing the content in order to type messages for sharing emotional reactions. In another example, the users may be able to share real-time video streams of one another, such as through a video conference. However, the amount of data needed to stream real-time videos captured from cameras of client devices is prohibitively large such that merely a few users are able to participate. Because video streaming is very resource intensive and consumes large amounts of bandwidth, video conferencing for sharing emotional reactions is impracticable and non-scalable.

Accordingly, as provided herein, landmark points, corresponding to facial features of a user, are captured at a client device, transmitted to a user reaction distribution service (e.g., one or more servers) for facial expression recognition, and provided to other client devices for reconstructing the facial expression, such as upon a three-dimensional model of an avatar, for display to users. Sharing of user expressions in a non-disruptive manner (e.g., sharing of user expressions without explicit user input otherwise needed to specify an emotional state of the user to share) can now become highly scalable (e.g., to hundreds of thousands of users) with dramatic reductions in computing resource and network bandwidth utilization.

Network bandwidth is reduced because the number of landmark points (e.g., between about 4 landmark points to about 240 landmark points or any other number of landmark points such as 180 landmark points) transmitted per frame from the client device to the user reaction distribution service is merely a fraction of the amount of pixel data per frame (e.g., 200,000 pixels per frame) that would otherwise be transmitted over a network such as for sharing real-time video streams of users (e.g., transferring 180 landmark points as opposed to 200,000 pixels per frame can reduce network bandwidth by about 200 times per user). In this way, network bandwidth is reduced for client devices and the user reaction distribution service. Computing resources of the user reaction distribution service are also reduced because the user reaction distribution service merely processes a small amount of landmarks point for facial expression determination (e.g., evaluation of 10 sets of landmark points per second, where a set of landmark points comprises about 180 landmark points from a frame) compared to evaluating the large amount of pixel data (e.g., evaluation of 600,000 pixels of data per second when 30 frames, each with 200,000 pixels, are sent to and processed by the user reaction distribution service per second). In this way, the user reaction distribution service may be capable of scaling up to hundreds of thousands to millions of users for emotional reaction sharing.

Also, sharing emotional reactions to content can now be done in a non-disruptive manner because the landmark points can be identified from video automatically captured with a camera and transmitted to the user reaction distribution service for facial expression recognition and distribution to other users without users having to stop watching the content and perform manual actions to explicitly input user emotional information such as typing a message or selecting an emotion to share with others. Also, privacy of the user is improved because the facial expression may be reconstructed upon an avatar (e.g., a three-dimensional model of a generic person, a cat, a monster, a robot, etc.) so that a video stream of frames depicting the user are not captured, transmitted to the user reaction distribution service, and sent to other users and client devices. User experience is also improved because the expressive avatar may be displayed within a region of the content that reduces occlusion of visual features of the content so that user's ability to view the content is not disrupted (e.g., visual features of a soccer video may be identified as a soccer ball, soccer player, goal, etc. using video analysis, feature recognition, and entity identification functionality so that an expressive avatar can be inserted into a region of the soccer video that reduces visual overlap or visual occlusion of the visual features).

It may be appreciated that emotional reaction sharing is not limited to merely facial expressions but may pertain to body movement, speech, etc. For example, emotional reaction data may be identified from video, audio, and/or other information relating to a user (e.g., a microphone recording a user crying, a camera capturing a user crossing her arms in frustration, the camera capturing a user waving her arms while cheering, etc.). The emotional reaction data may be shared with other users in a variety of ways. In an example, the emotional reaction data may be shared through the selection of a statement, animation, or image associated with an emotional reaction (e.g., a statement "#$@%^#" illustrating frustration, a two-dimensional image depicting a cheering cat, etc.) for display to other users. In another example, the emotional reaction data may be shared by rendering a three-dimensional body model of an avatar expressing an emotional reaction (e.g., a dog jumping around cheering) In another example, the emotional reaction data may be shared through augmented reality (e.g., while watching a live speech using an augmented reality device, an avatar, image, symbol, text, animation, etc. associated with emotional reactions of users viewing the live speech may be displayed as augmented reality through the augmented reality device). In another example, the emotional reaction data may be shared through video conferencing (e.g., users of a video conference may be represented by avatars through which emotions are expressed, which may drastically reduce resource utilization and bandwidth otherwise used to display live streams of users during the video conference).

It may be appreciated that the user may take affirmative action, such as providing opt-in consent, to allow access to and/or use of an input device (e.g., a microphone, a camera, etc.) of a client device and/or any other type of information, such as for the purpose of emotional reaction recognition and sharing (e.g., where the user responds to a prompt regarding the collection and/or use of such information). The user may also opt-out from providing access to such information or portions thereof (e.g., access may be provided to the microphone but not the camera).

Figure 4:
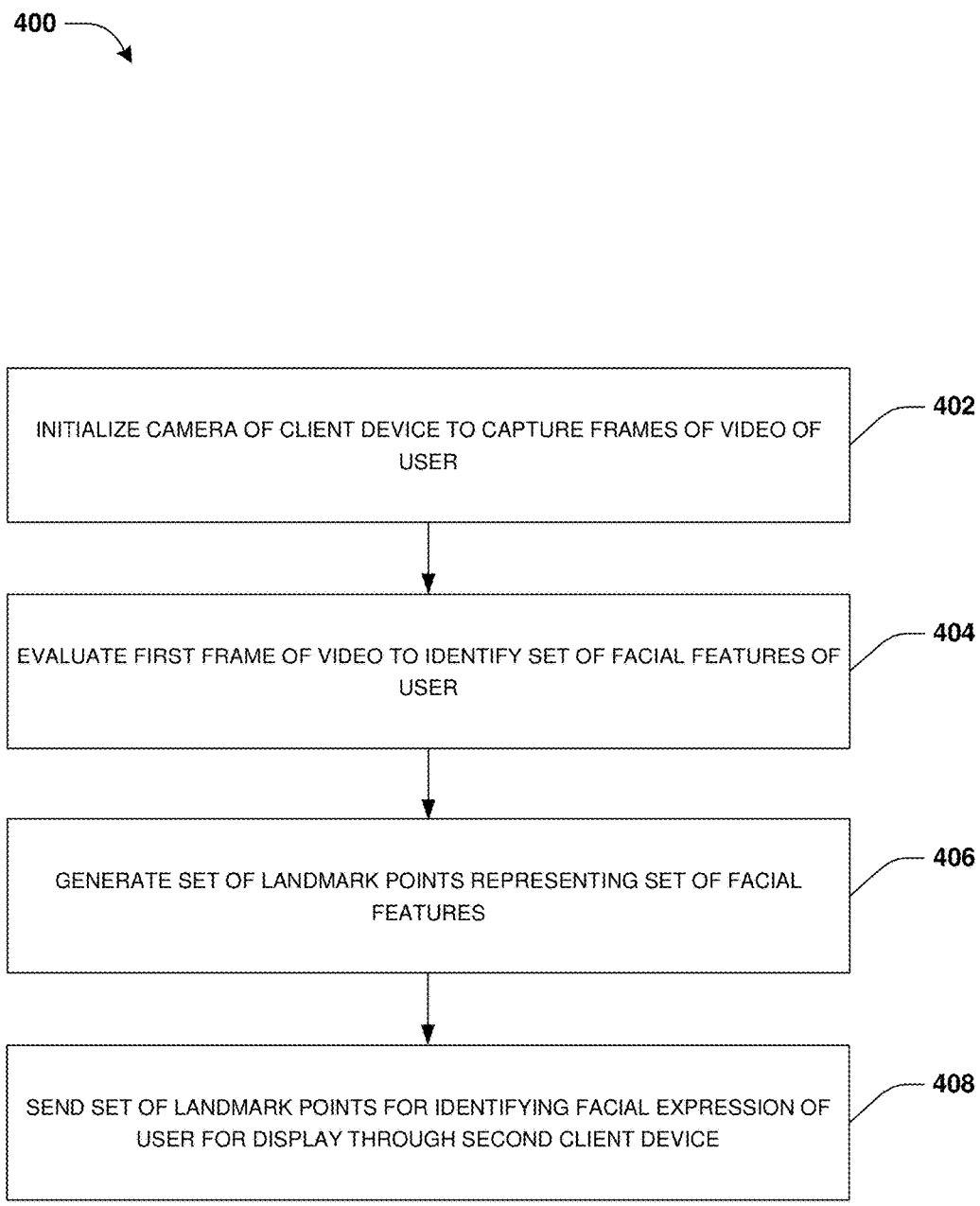
FIG. 4 is a flow chart illustrating an example method for emotional reaction sharing.

An embodiment of emotional reaction sharing is illustrated by an example method 400 of FIG. 4. A user of a client device may be viewing content through the client device. For example, the user may be watching a live newscast of a videogame conference. The user may desire to share emotional reactions of viewing the videogame conference with other users watching the videogame conference. Accordingly, responsive to determining that the user is viewing the videogame conference through the client device, a camera of the client device may be initialized to capture one or more frames of video of the user, at 402. It may be appreciated that any type of input capture device may be initialized for obtaining emotional reaction data of the user (e.g., a microphone may be initialized to capture audio content of the user for identifying cheering, crying, excited statements, etc.).

At 404, frames, such as a first frame, of the video may be evaluated to identify a set of facial features of the user. In an example, image recognition functionality may be used to evaluate pixels of the first frame to identify lines, shapes, clusters of similar colors, and/or other image features. Entity recognition functionality may be used to determine that the lines, shapes, clusters of similar colors, and/or other image features are indicative of an entity, such as a person, a nose, an eye, glasses, etc. (e.g., facial recognition may be used to identify a mouth from lines, shapes, and colors). In another example, audio recognition functionality may be used to evaluate the audio content of the user to identify audio features, such as pitch, frequency, voices, music, background noise, silence, etc. that may be indicative of audible user reactions and moods of the user such as crying cheering, etc.

At 406, a set of landmark points, representing the set of facial features within the first frame, may be generated (e.g., 4 landmark points, corresponding to portions of an eye, may be identified by the image recognition functionality and the entity recognition functionality). In an example, the set of landmark points may comprise locations/coordinates for between about 4 landmark points to about 240 landmark points, such as 180 landmark points or any other number of landmark points. A landmark point may correspond to one or more pixels depicting a facial feature at a certain point in time. In an example, the set of landmark points may comprise a number of landmark points (e.g., 180 landmark points) that is less than one percent or any other percentage of a pixel count of the first frame (e.g., the first frame may comprise hundreds of thousands to millions of pixels). In an example, the set of landmark points are identified in real-time as the user watches the content, and thus sets of landmark points may be identified and tracked (e.g., locations of landmark points may be tracked over time to identify locational changes of the landmark points that are indicative of facial feature movements, such as movement of an ear) so that facial movement such as a facial expression can be identified (e.g., 180 landmark points may be identified per frame at a rate of 10 frames per second or any other framerate).

At 408, the set of landmark points may be sent to a user reaction distribution service (e.g., a server) for identification and reconstruction of a facial expression of the user, based upon the set of landmark points, for display through a second client device to a second user that is viewing the content (e.g., and/or for display to other users viewing the content). In an example, the sets of landmark points, identified in real-time as the user watches the content, are sent to the user reaction distribution service for identification and reconstruction of the facial expression. The facial expression may be reconstructed (e.g., at the second client device) upon an avatar, representing the user, for display through the second client device. For example, the avatar may be selected for presentation to the second user based upon the user specifying a preference for being represented to other users using the avatar (e.g., the user may prefer to be depicted as a robot to other users). In another example, the avatar may be selected for presentation to the second user based upon the second user specifying a preference for other users to be represented as the avatar (e.g., the second user may prefer to see users as monsters).

In an example where audio content of the user is captured by the microphone of the client device, the audio content may be evaluated to identify a mood of the user (e.g., audio characteristics indicative of the user screaming angrily). The mood of the user may be sent to the user reaction distribution service for use in identifying the facial expression of the user.

In an example, the camera may be transitioned into an off state or a lower power state in response to determining that the user is not viewing the content. In this way, battery consumption of the client device and network bandwidth used to send landmark points to the user reaction distribution service may be reduced.

Figure 5:
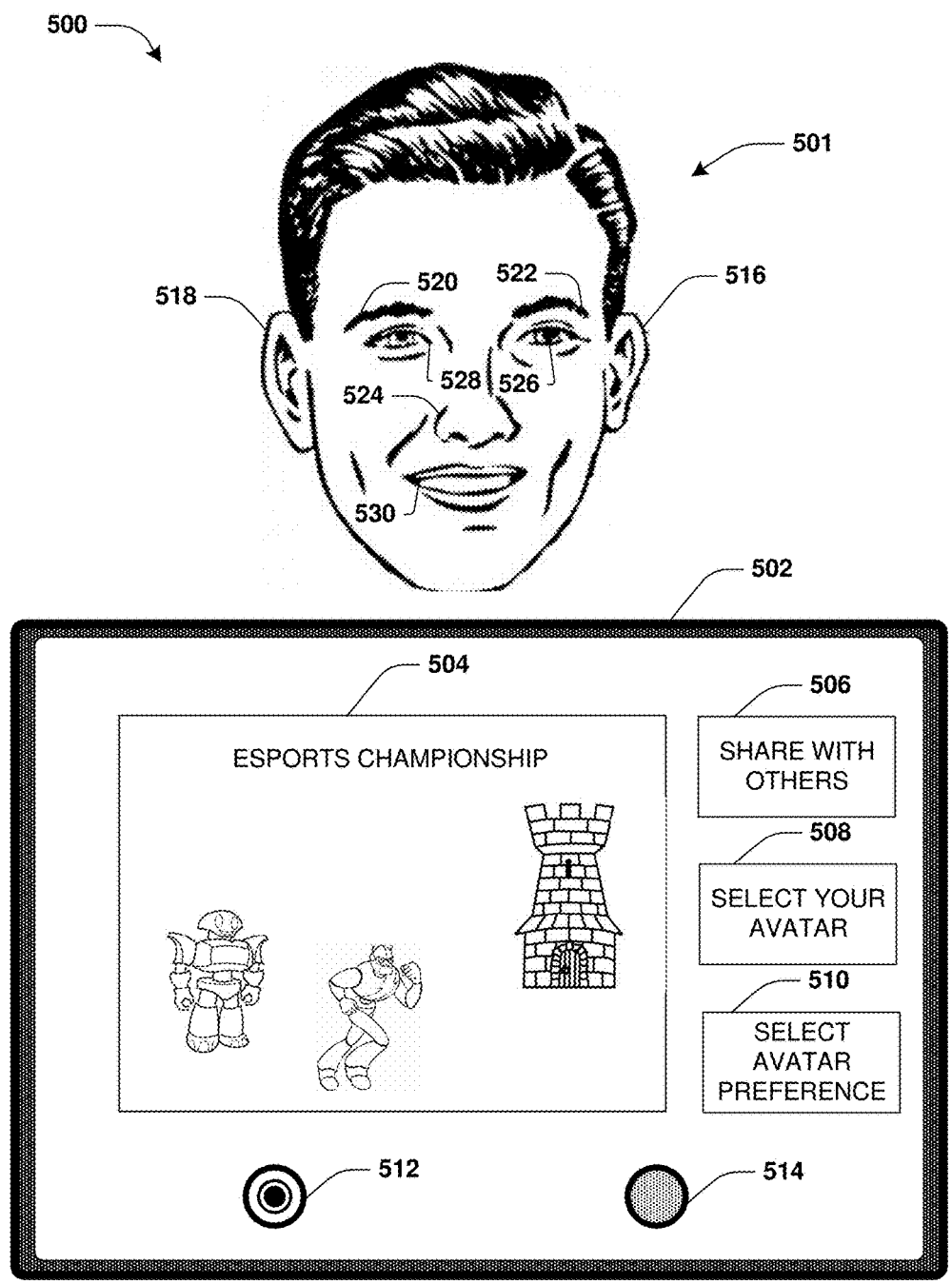
FIG. 5 is a component block diagram illustrating an example system for emotional reaction sharing, where landmark points are identified.

FIG. 5 illustrates an example of a system 500 for emotional reaction sharing. A user 501 of a client device 502 may access content, such as a live stream of an eSports championship 504. The user 501 may have provided opt-in consent, such as through a share interface 506, to share emotional reactions of the user 501 while viewing the eSports championship 504. The user 501 may select an avatar to represent the user to other users, such as through a select avatar interface 508 (e.g., the user 501 may request to be represented by a face of a frog, which improves user privacy and security by not sharing actual depictions of the user 501). The user 501 may also specify what types of avatar are to represent other users to the user 501, such as through a select avatar preference interface 510 (e.g., the user 501 may specify that other users are to be represented by robots).

Responsive to determining that the user 501 is viewing the eSports championship 504, a camera 512 and/or a microphone 514 may be initialized. The camera 512 may be used to capture one or more frames of video of the user 501. The frames may be evaluated to identify facial features of the user 501, such as a first ear 518, a second ear 516, a first eyebrow 520, a second eyebrow 522, a first eye 528, a second eye 526, a nose 524, a mouth 530, and/or other facial features. The frames may be captured and evaluated in real-time to generate sets of landmark points representing locations of facial features within the frames as the user 501 views the eSports championship 504. The microphone 514 may be utilized to capture audio content of the user 501 that is evaluated to identify a mood of the user. In this way, the sets of landmark points and/or the mood may be sent from the client device 502 to a user reaction distribution service (e.g., user reaction distribution service 710 of FIG. 7) for reconstructing a facial expression of the user, based upon the sets of landmark points, for display to other users. For example, the sets of landmark points may comprise locations or coordinates of the facial features, and thus may be indicative of locational changes of the facial features representative of facial movement corresponding to facial expressions (e.g., movements of the mouth 530 may be indicative of the user shouting with excitement).

Figure 6:
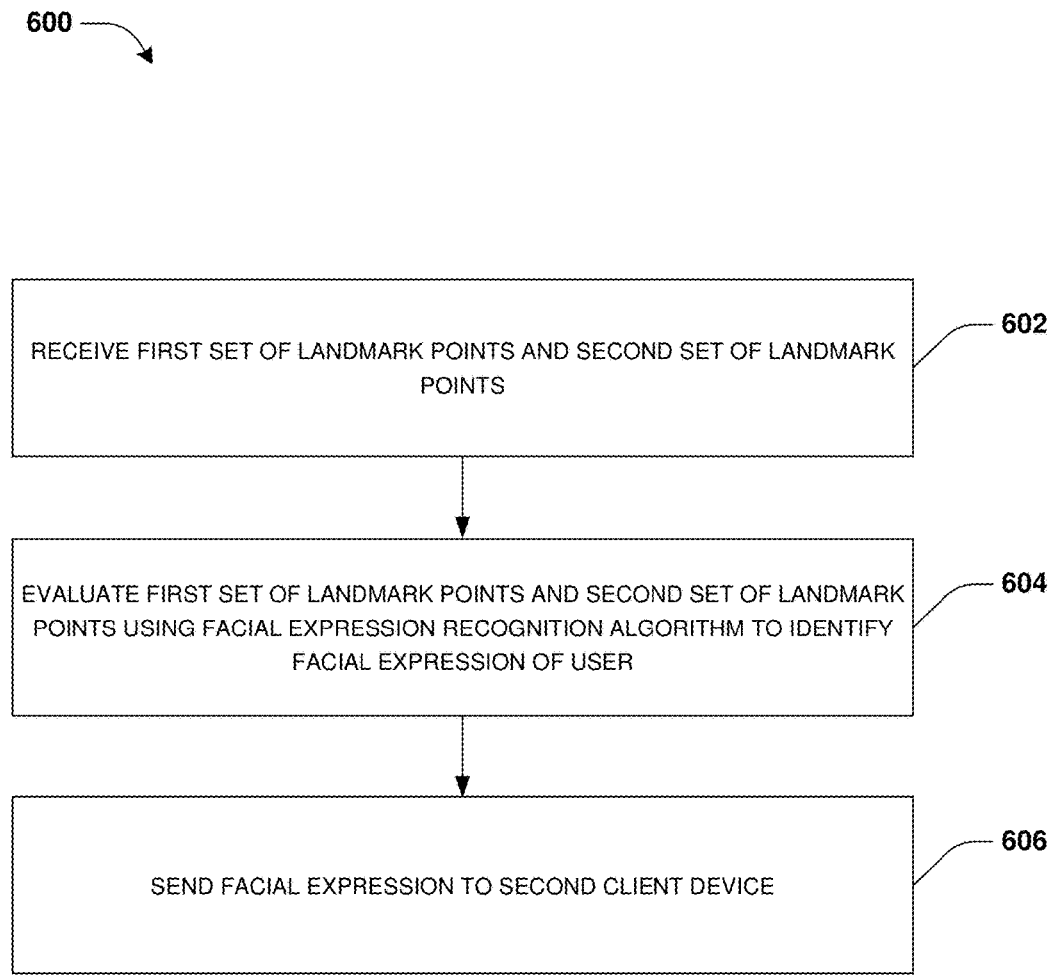
FIG. 6 is a flow chart illustrating an example method for emotional reaction sharing.

An embodiment of emotional reaction sharing is illustrated by an example method 600 of FIG. 6. A user reaction distribution service (e.g., a server) may be configured to receive sets of landmark points from client devices (e.g., scalable to hundreds of thousands of client devices), evaluate the sets of landmark points to identify facial expressions of users viewing content, and provide a facial expression to client devices (e.g., a highest ranked or most common facial expression) for reconstruction and display to the users. Accordingly, sets of landmark points, such as a first set of landmark points and a second set of landmark points, may be received from a client device of a user viewing the content, such as a live stream of an eSports championship, at 602. The sets of landmark points may represent locations of facial features of the user at various points in time while viewing the eSports championship through the client device.

At 604, the sets of landmark points may be evaluated, using a facial expression recognition algorithm that maps changes in location of landmark points to facial movements indicative of facial expressions (e.g., coordinate changes of 5 landmark points representing different points of a mouth may be indicative of the user frowning), to identify a facial expression of the user while the user is viewing the eSports championship. In an example, audio content of the user and/or a mood of the user identified from the audio content may be used to identify and/or verify the facial expression. At 606, the facial expression (e.g., landmark points used to reconstruct the facial expression upon a model at a second client device for display; a designation of the facial expression, such as frowning, used by the second client device to query an expression repository to identify an image, animation, text, or symbol representative of the facial expression; the image, animation, text, or symbol representative of the facial expression; etc.) may be sent to the second client device, of a second user that is viewing the eSports championship, for display to the second user. The facial expression may be sent to any number of client devices of users that are viewing the eSports championship.

In an example, a set of facial expressions of users viewing the eSports championship may be identified from landmark points provided by client devices of the users. The set of facial expressions may be ranked based upon various metrics such as an interestingness expression metric (e.g., how unique, interesting, exaggerated, and/or expressive is a facial expression, such as changes in landmark points of a user indicating a much larger or uniquely shaped smile than that of other users), a common expression metric (e.g., a more commonly occurring facial expression may be ranked higher than an uncommon outlier facial expression), etc. In this way, the facial expression may be selected from the set of facial expressions to send based upon the facial expression having a rank exceeding a threshold (e.g., a highest ranked facial expression).

In an example, the facial expression recognition algorithm may be trained to identify various types of facial expressions. For example, a training set of landmark points may comprise sets of labeled landmark points having facial expression labels (e.g., a series of labeled landmark points may be indicative of facial movement of a particular type of facial expression such as eye movement indicative of crying). In this way, precision of the facial expression recognition algorithm may be improved.

Figure 7:
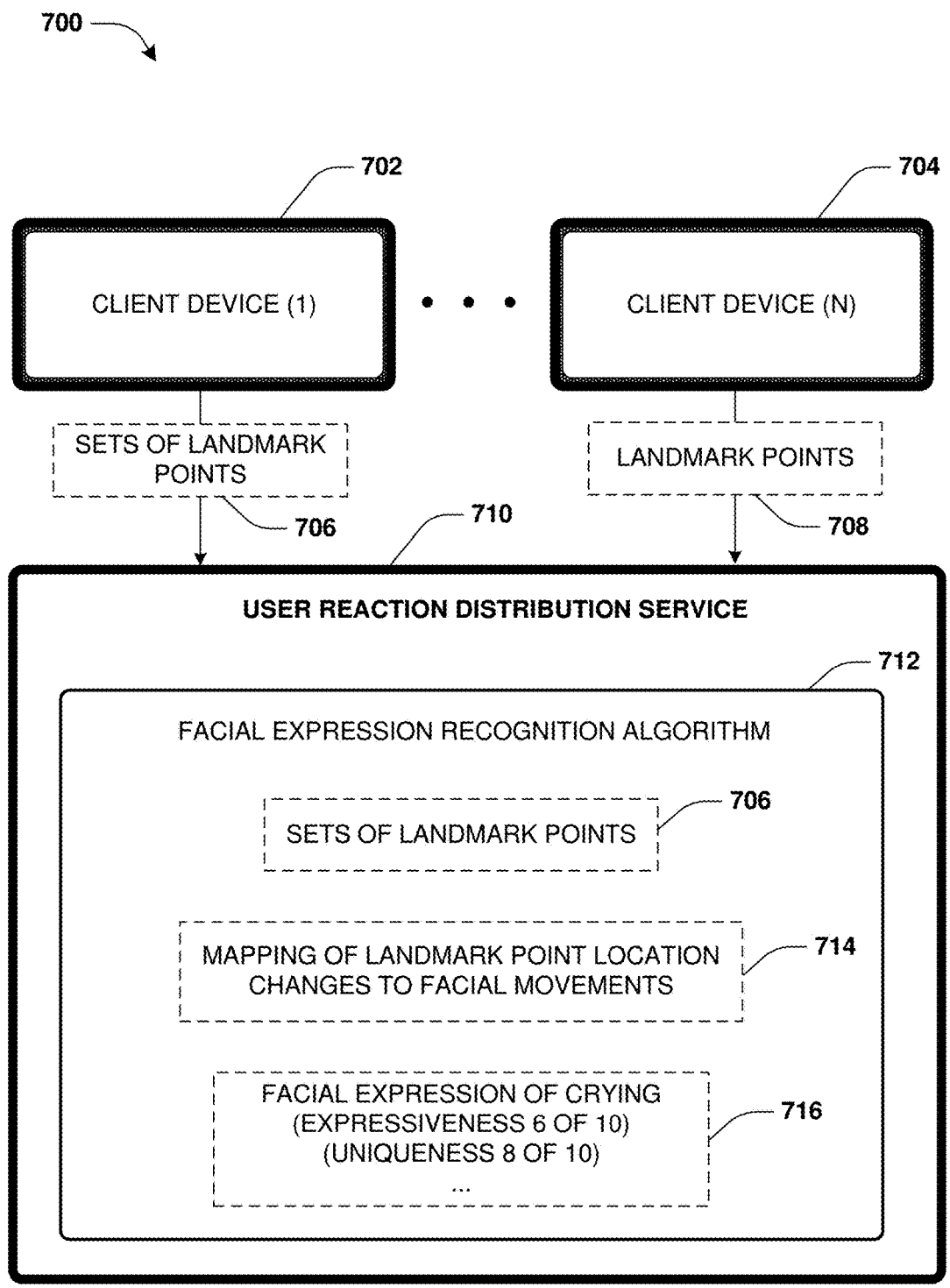
FIG. 7 is a component block diagram illustrating an example system for emotional reaction sharing, where a facial expression is identified.

FIG. 7 illustrates an example of a system 700 for emotional reaction sharing. A user reaction distribution service 710 (e.g., one or more servers) may be configured to receive landmark points from client devices, identify facial expressions of users of the client devices while viewing content, and provide facial expressions to client devices of users viewing the content (e.g., provide landmark points used by client devices to reconstruct facial expressions upon models of avatars for display to users). For example, the user reaction distribution service 710 may receive sets of landmark points 706 from a first client device 702 and/or landmark points from other client devices such as landmark points 708 from an nth client device 704. The sets of landmark points 706 may comprise a first set of landmark points of facial features of a user of the first client device 702 at a first point in time, a second set of landmark points of the facial features of the user at a second point in time, and/or other sets of landmark points of the facial features of the user over time while viewing the content.

The user reaction distribution service 710 may execute a facial expression recognition algorithm 712 used to evaluate the set of landmark points 706 to identify a facial expression of the user. For example, the facial expression recognition algorithm 712 may identify locations and locational changes of landmark points, which may be indicative of facial movement of the facial features of the user. In this way, the facial expression recognition algorithm 712 may create a mapping 714 of landmark point location changes to facial movements (e.g., 7 landmark points corresponding to facial features of a mouth and 10 landmark points of facial features of eyes may change positions over time in a manner indicative of the user crying). The mapping 714 may be used to determine that the user has a facial expression 716 of crying. The sets of landmark points 706 may be evaluated to determine an expressiveness of the crying (e.g., a uniqueness of 6 out of 10 indicative of a moderately expressive crying expression), a uniqueness of the crying (e.g., a uniqueness of 8 out of 10 indicative of a very unique crying expression), etc. In this way, the facial expression 716 of crying (e.g., landmark points that may be used to reconstruct a crying facial expression and/or other data such as an avatar preference of the user for representing the user to other users) may be sent to client devices, of users viewing the content, for reconstruction and display.

Figure 8:
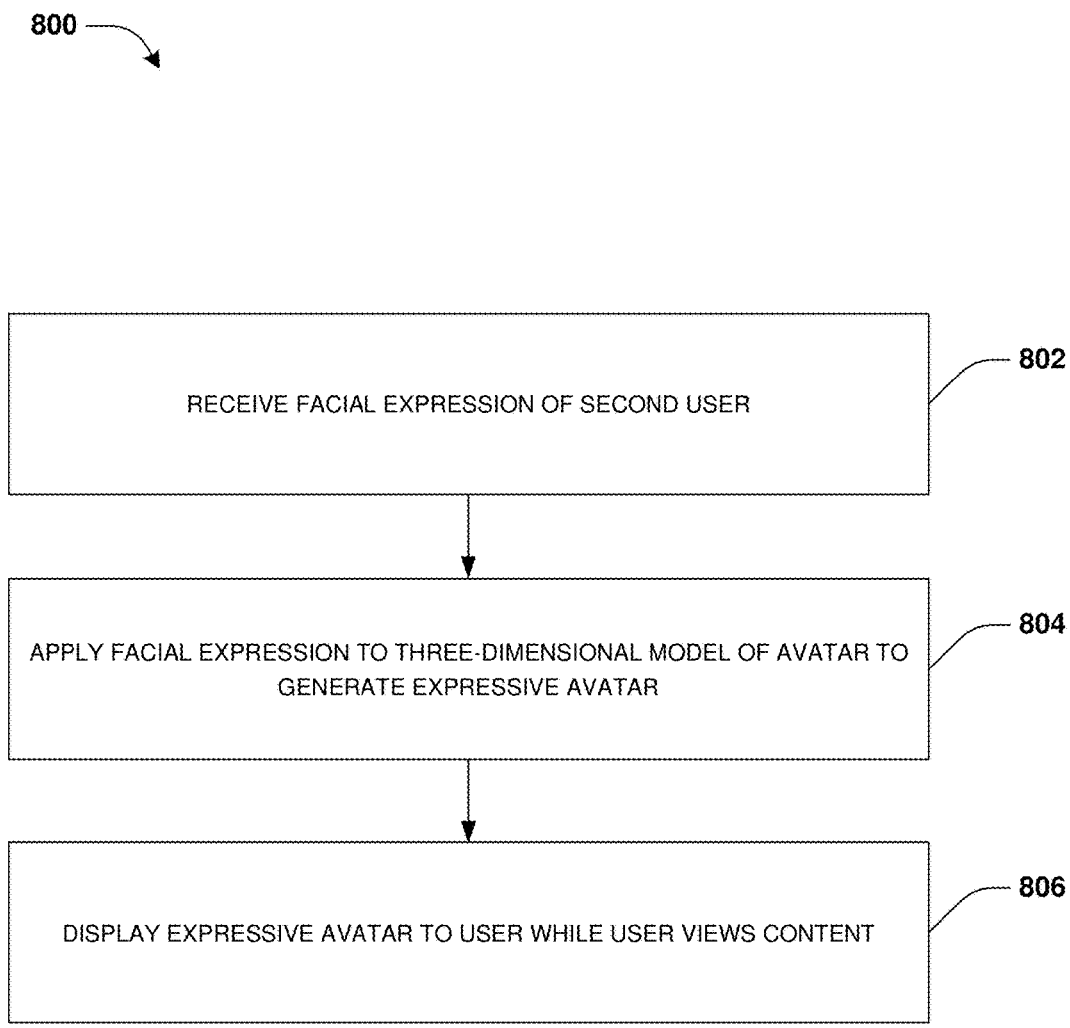
FIG. 8 is a flow chart illustrating an example method for emotional reaction sharing.

An embodiment of emotional reaction sharing is illustrated by an example method 800 of FIG. 8. In an example, a user, viewing content (e.g., a videogame, a video conference, a live stream video, augmented reality, a video, etc.), may be interested in how other users are emotionally reacting to the content. Accordingly, a facial expression, of a second user while the second user is viewing the content, may be received from a user reaction distribution service at a client device of the user while the user is viewing the content, at 802. In an example, the facial expression comprises an image, an animation, text, a symbol, or any other information that can be displayed to the user to convey the facial expression. In another example, the facial expression may comprise a description of the facial expression (e.g., a joyous smile) that may be used to query an expression repository for an image, an animation, text, a symbol, etc. having the facial expression for display to the user. In another example, the facial expression comprises a set of landmark points or other data that may be applied to a model of an avatar for display to the user.

At 804, the facial expression may be applied to a three-dimensional model of an avatar to generate an expressive avatar having the facial expression. For example, the facial expression may comprise landmark points that may be used to select a bone structure mapping, from a set of bone structure mappings, which comprises facial bone structures that can be used to construct the facial expression upon the three-dimensional model. The landmark points may be used to select a muscle movement mapping, from a set of muscle movement mappings, which comprises muscles and muscle movements that can be applied to the facial bone structures to construct the facial expression upon the three-dimensional model (e.g., facial muscles and movements that can be applied to facial bone structures to create the expressive avatar having a joyous facial expression). It may be appreciated that the expressive avatar is not limited to merely facial expressions but can be constructed from other emotional reaction data, such as landmark points of the second user's body jumping for joy that may be used to create the expressive avatar jumping for joy (e.g., utilizing body bone mappings and body muscle mappings). In an example, the avatar may be selected based upon a user avatar preference (e.g., the user may specify that emotions of other users are to be displayed using cat avatars; the second user may specify that the second user's facial expressions are to be displayed to other users through a robot avatar; etc.).

At 806, the expressive avatar may be displayed to the user while the user views the content. In an example, the expressive avatar may be displayed within a separate user interface than a content user interface through which the content is being displayed. In another example, the expressive avatar may be displayed within the content user interface (e.g., overlaid the content). For example, the content may be evaluated to identify a visual feature of the content (e.g., the content may comprise a president speech in a field, where a president is identified as a first entity visual feature, a flag is identified as a second entity visual feature, and the field of grass is identified as a background). A region within the content, into which the expressive avatar may be added without occluding visual features above a threshold amount (e.g., minimized occlusion of the first entity visual feature and the second entity visual feature), may be identified. For example, the region may encompass the field of grass but not the president and not the flag. In an example, a size, transparency, color, or other characteristic of the expressive avatar and/or the content may be modified to reduce occlusion. In this way, the expressive avatar may be displayed within the region.

In another example, the expressive avatar may be displayed within a user interface element (e.g., a bubble). An animation display property may be applied to the user interface element (e.g., a fade property, a movement property, a zoom in or out property, a transparency property, etc.). For example, the animation display property may specify that the user interface element is to expand in size until reaching a size threshold and then the user interface element is to disappear. In this way, the expressive avatar, the facial expression, and/or other emotional reaction information may be conveyed to users.

Figure 9:
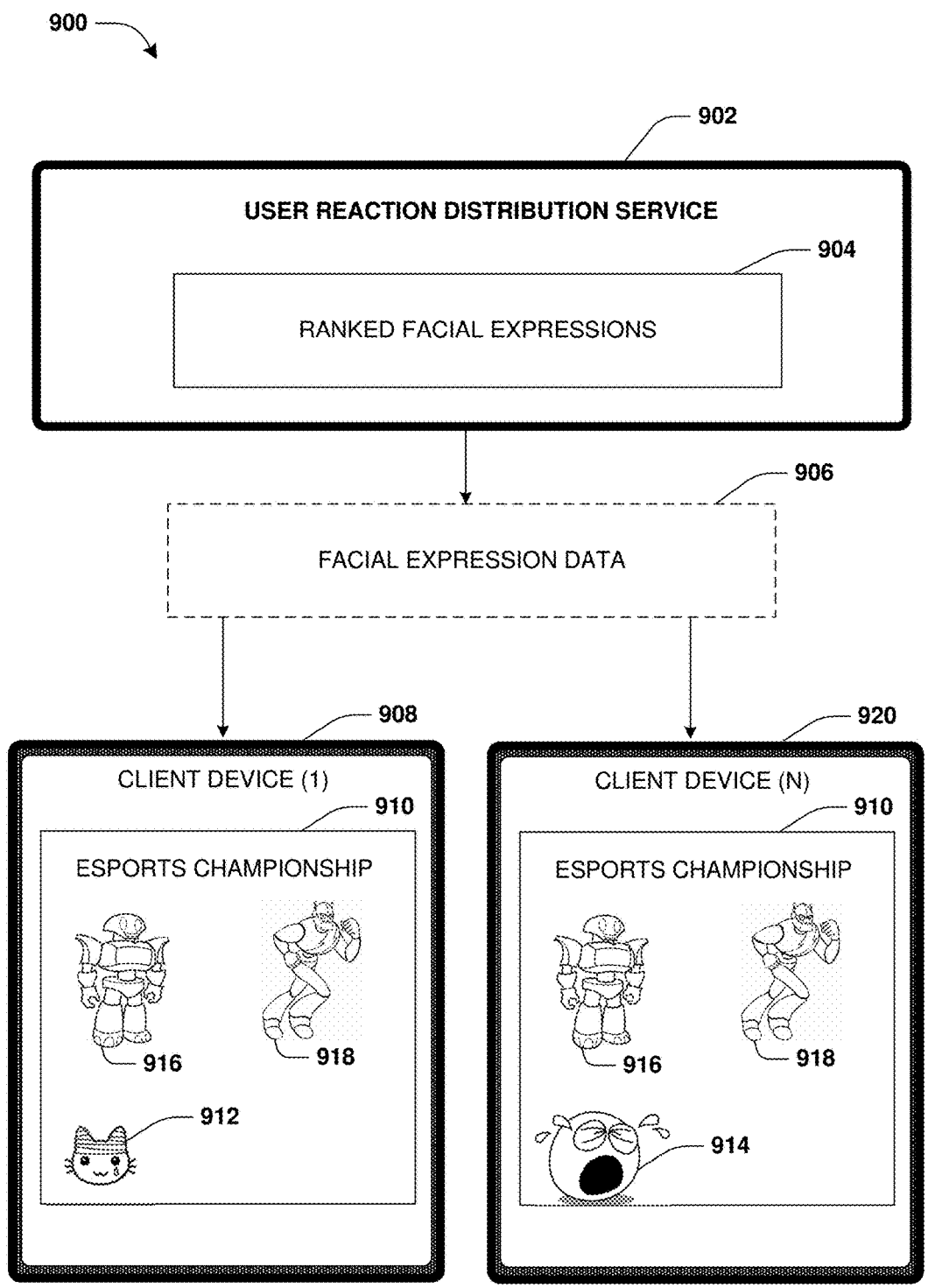
FIG. 9 is a component block diagram illustrating an example system for emotional reaction sharing, where an expressive avatar is displayed.

FIG. 9 illustrates an example of a system 900 for emotional reaction sharing. A user reaction distribution service 902 (e.g., one or more servers) may have identified facial expressions of users watching an eSports championship 910 live stream. The user reaction distribution service 902 may have ranked the facial expressions such as based upon a uniqueness metric (e.g., more unique and/or interesting facial expressions may be ranked higher than less unique and/or boring facial expressions). Accordingly, facial expression data 906 of a ranked facial expression may be selected from ranked facial expressions 904 and provided to client devices of users viewing the eSports championship 910. For example, the facial expression data 906 may comprise landmark points that can be applied to models of avatar to create a crying with tears facial expression of a user watching the eSports championship 910. The facial expression data 906 may comprise other metadata and tags, such as an avatar preference of a user from which the crying with tears facial expression was identified (e.g., the avatar preference may indicate that the user prefers to be represented as a cat if other users have not specified how users are to be displayed to them).

The facial expression data 906 may be provided to a first client device 908 of a first user and/or other client devices such as an nth client device 920 of an nth user. At the first client device 908, the facial expression data 906, such as the landmark points, may be applied to a bone structure mapping and a muscle movement mapping for a cat avatar, corresponding to the avatar preference of the user, to create an expressive cat avatar 912 having the crying with tears facial expression. The eSports championship 910 may be evaluated to identify visual features, such as a first robot player 916 and a second robot player 918. A region within the eSports championship 910, such as a lower left region, may be identified as having reduced (e.g., minimized) overlap with the first robot player 916 the second robot player 918, and/or other visual features. Accordingly, the expressive cat avatar 912 may be displayed within the region to reduce occlusion of the visual features.

In an example, the nth client of the nth client device 920 may express a preference for round head avatars. Accordingly, the facial expression data 906, such as the landmark points, may be applied to a bone structure mapping and a muscle movement mapping for a round head avatar, corresponding to the preference of the nth user, to create an expressive round head avatar 914 having the crying with tears facial expression. In this way, the expressive round head avatar 914 may be displayed to the nth client while viewing the eSports championship 910.

Figure 10:
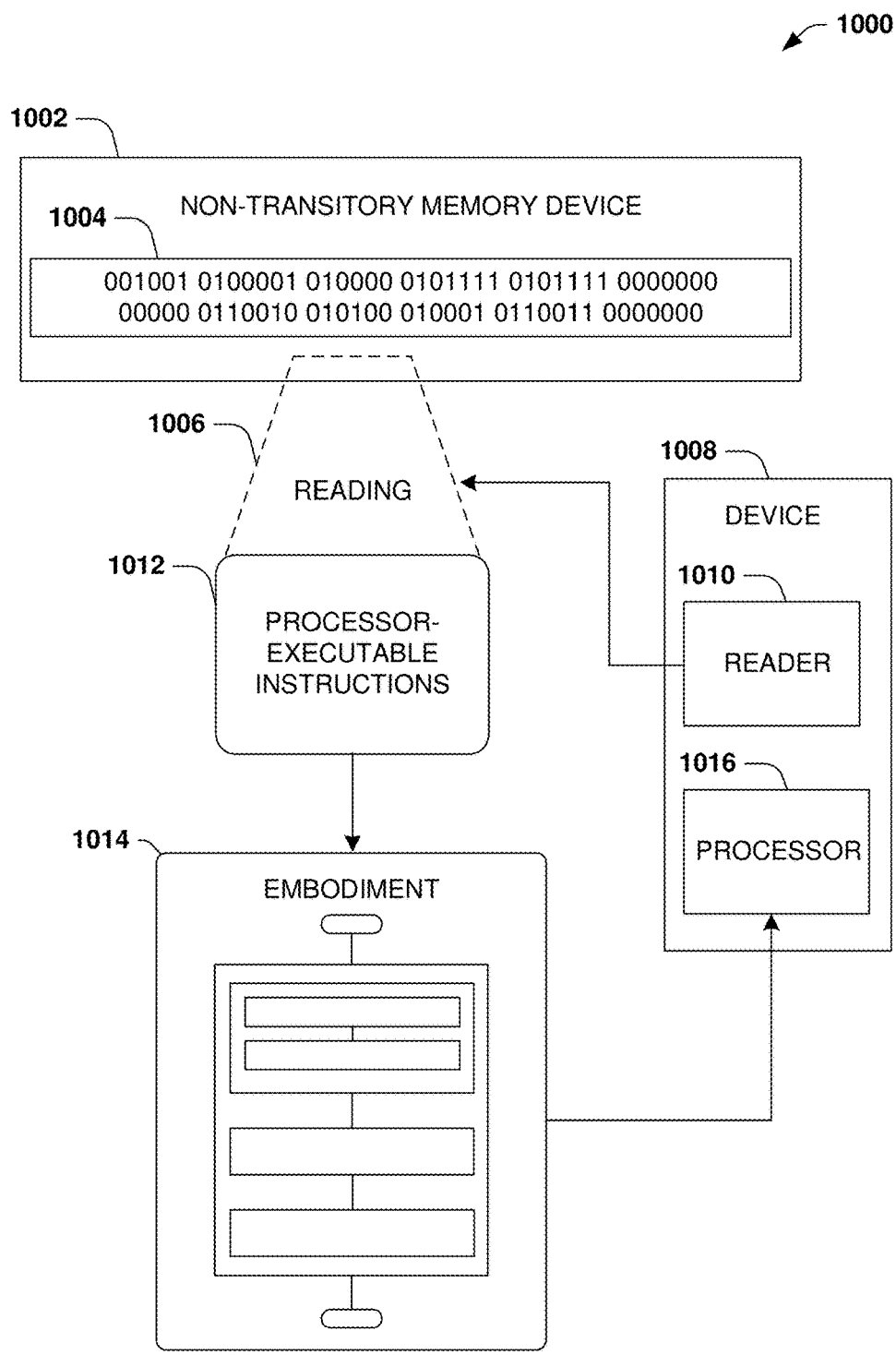
FIG. 10 is an illustration of a scenario featuring an example non-transitory machine readable medium in accordance with one or more of the provisions set forth herein.

FIG. 10 is an illustration of a scenario 1000 involving an example non-transitory machine readable medium 1002. The non-transitory machine readable medium 1002 may comprise processor-executable instructions 1012 that when executed by a processor 1016 cause performance (e.g., by the processor 1016) of at least some of the provisions herein. The non-transitory machine readable medium 1002 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1002 stores computer-readable data 1004 that, when subjected to reading 1006 by a reader 1010 of a device 1008 (e.g., a read head of a hard disk drive, or a read operation invoked on a solid-state storage device), express the processor-executable instructions 1012. In some embodiments, the processor-executable instructions 1012, when executed cause performance of operations, such as at least some of the example method 400 of FIG. 4, at least some of the example method 600 of FIG. 6, and/or at least some of the example method 800 of FIG. 8, for example. In some embodiments, the processor-executable instructions 1012 are configured to cause implementation of a system, such as at least some of the example system 500 of FIG. 5, at least some of the example system 700 of FIG. 7, and/or at least some of the example system 900 of FIG. 9, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A computing device comprising:
a processor; and
memory comprising processor-executable instructions that when executed by the processor cause performance of operations, the operations comprising:
   receiving, at a user reaction distribution service, a first set of landmark points, a second set of landmark points, and a mood of a first user from a client device, wherein:
      the first set of landmark points represents a set of facial features of the first user at a first point in time and the second set of landmark points represents the set of facial features of the first user at a second point in time while the first user is viewing content through the client device, and
      the mood is identified at the client device from audio of the first user while the first user is viewing the content through the client device;
   evaluating, at the user reaction distribution service, the first set of landmark points and the second set of landmark points, using a facial expression recognition algorithm that maps changes in location of landmark points to facial movements indicative of facial expressions, to identify a facial expression of the first user while the first user is viewing the content;
   verifying the facial expression of the first user based upon the mood;
   identifying, at the user reaction distribution service, a set of facial expressions of other users viewing the content during a time interval between the first point in time and the second point in time based upon landmark points received from client devices of the other users, wherein:
      the client device of the first user and the client devices of the other users define a group of client devices, and
      the facial expression of the first user and the set of facial expressions of other users define a group of facial expressions;
   ranking, at the user reaction distribution service, the group of facial expressions to determine a most frequently occurring facial expression, amongst the group of facial expressions, during the time interval; and
   sending, from the user reaction distribution service, the most frequently occurring facial expression to a plurality of client devices amongst the group of client devices in real-time during viewing of the content by the first user and by the other users.

2. The computing device of claim 1, wherein the operations comprise:
   training the facial expression recognition algorithm to identify a type of facial expression based upon a training set of landmark points associated with the type of facial expression, the training set of landmark points corresponding to facial movement indicative of the type of facial expression.

3. The computing device of claim 1, wherein:
the first user and the other users define a group of users, and
the operations comprise:
   identifying, at the user reaction distribution service, a second set of facial expressions of the group of users viewing the content;

ranking, at the user reaction distribution service, the second set of facial expressions based upon frequency;
identifying, at the user reaction distribution service, a change to the most frequently occurring facial expression based upon the ranking the second set of facial expressions; and
sending, from the user reaction distribution service, an update to the plurality of client devices in real-time during viewing of the content by the group of users based upon the change.

4. The computing device of claim 3, wherein:
the second set of facial expressions comprises facial expressions of the group of users during a second time interval, and
the time interval corresponds to a first interval of time during which a first portion of the content is viewed and the second time interval corresponds to a second interval of time during which a second portion of the content is viewed.

5. The computing device of claim 1, wherein the sending comprises sending a set of landmark points corresponding to the most frequently occurring facial expression to the plurality of client devices.

6. The computing device of claim 1, wherein the sending comprises sending at least one of an image, animation, text, or symbol representative of the most frequently occurring facial expression to the plurality of client devices.

7. A method of emotional reaction sharing, the method comprising:
receiving, at a user reaction distribution service, a first set of landmark points, a second set of landmark points, and a mood of a first user from a client device, wherein:
the first set of landmark points represents a set of facial features of the first user at a first point in time and the second set of landmark points represents the set of facial features of the first user at a second point in time while the first user is viewing content through the client device, and
the mood is identified at the client device from audio of the first user while the first user is viewing the content through the client device;
evaluating, at the user reaction distribution service, the first set of landmark points and the second set of landmark points, using a facial expression recognition algorithm that maps changes in location of landmark points to facial movements indicative of facial expressions, to identify a facial expression of the first user while the first user is viewing the content;
verifying the facial expression of the first user based upon the mood;
identifying, at the user reaction distribution service, a set of facial expressions of other users viewing the content during a time interval between the first point in time and the second point in time based upon landmark points received from client devices of the other users, wherein:
the client device of the first user and the client devices of the other users define a group of client devices, and
the facial expression of the first user and the set of facial expressions of other users define a group of facial expressions;
ranking, at the user reaction distribution service, the group of facial expressions to determine a most frequently occurring facial expression, amongst the group of facial expressions, during the time interval; and
sending, from the user reaction distribution service, the most frequently occurring facial expression to a plurality of client devices amongst the group of client devices in real-time during viewing of the content by the first user and by the other users.

8. The method of claim 7, comprising:
training the facial expression recognition algorithm to identify a type of facial expression based upon a training set of landmark points associated with the type of facial expression, the training set of landmark points corresponding to facial movement indicative of the type of facial expression.

9. The method of claim 7, wherein:
the first user and the other users define a group of users, and
the method comprises:
identifying, at the user reaction distribution service, a second set of facial expressions of the group of users viewing the content;
ranking, at the user reaction distribution service, the second set of facial expressions based upon frequency;
identifying, at the user reaction distribution service, a change to the most frequently occurring facial expression based upon the ranking the second set of facial expressions; and
sending, from the user reaction distribution service, an update to the plurality of client devices in real-time during viewing of the content by the group of users based upon the change.

10. The method of claim 9, wherein:
the second set of facial expressions comprises facial expressions of the group of users during a second time interval, and
the time interval corresponds to a first interval of time during which a first portion of the content is viewed and the second time interval corresponds to a second interval of time during which a second portion of the content is viewed.

11. A non-transitory machine readable medium having stored thereon processor-executable instructions that when executed cause performance of operations, the operations comprising:
receiving, at a user reaction distribution service, a first set of landmark points, a second set of landmark points, and a mood of a first user from a client device, wherein:
the first set of landmark points represents a set of facial features of the first user at a first point in time and the second set of landmark points represents the set of facial features of the first user at a second point in time while the first user is viewing content through the client device, and
the mood is identified at the client device from audio of the first user while the first user is viewing the content through the client device;
evaluating, at the user reaction distribution service, the first set of landmark points and the second set of landmark points, using a facial expression recognition algorithm that maps changes in location of landmark points to facial movements indicative of facial expressions, to identify a facial expression of the first user while the first user is viewing the content;
verifying the facial expression of the first user based upon the mood;
identifying, at the user reaction distribution service, a set of facial expressions of other users viewing the content during a time interval between the first point in time and the second point in time based upon landmark points received from client devices of the other users, wherein:

the client device of the first user and the client devices of the other users define a group of client devices, the first user and the other users define a group of users, and the facial expression of the first user and the set of facial expressions of other users define a group of facial expressions;

ranking, at the user reaction distribution service, the group of facial expressions to determine a most frequently occurring facial expression, amongst the group of facial expressions, during the time interval; and sending, from the user reaction distribution service, the most frequently occurring facial expression to a plurality of client devices amongst the group of client devices in real-time during viewing of the content by the first user and by the other users.

12. The non-transitory machine readable medium of claim 11, comprising:

training the facial expression recognition algorithm to identify a type of facial expression based upon a training set of landmark points associated with the type of facial expression, the training set of landmark points corresponding to facial movement indicative of the type of facial expression.

13. The non-transitory machine readable medium of claim 11, wherein the sending the most frequently occurring facial expression comprises sending a set of landmark points corresponding to the most frequently occurring facial expression to the plurality of client devices.

14. The non-transitory machine readable medium of claim 11, the operations comprising:

identifying, at the user reaction distribution service, a second set of facial expressions of the group of users viewing the content;

ranking, at the user reaction distribution service, the second set of facial expressions based upon frequency;

identifying, at the user reaction distribution service, a change to the most frequently occurring facial expression based upon the ranking the second set of facial expressions; and sending, from the user reaction distribution service, an update to the plurality of client devices in real-time during viewing of the content by the group of users based upon the change.

15. The non-transitory machine readable medium of claim 14, wherein:

the second set of facial expressions comprises facial expressions of the group of users during a second time interval, and the time interval corresponds to a first interval of time during which a first portion of the content is viewed and the second time interval corresponds to a second interval of time during which a second portion of the content is viewed.

16. The non-transitory machine readable medium of claim 14, wherein the sending the update comprises sending a set of landmark points corresponding to the most frequently occurring facial expression to the plurality of client devices.

17. The non-transitory machine readable medium of claim 11, the operations comprising:

identifying, at the user reaction distribution service, a second set of facial expressions of the group of users viewing the content;

ranking, at the user reaction distribution service, the second set of facial expressions based upon frequency; and identifying, at the user reaction distribution service, a change to the most frequently occurring facial expression based upon the ranking the second set of facial expressions.

18. The non-transitory machine readable medium of claim 17, wherein:

the second set of facial expressions comprises facial expressions of the group of users during a second time interval, and the time interval corresponds to a first interval of time during which a first portion of the content is viewed and the second time interval corresponds to a second interval of time during which a second portion of the content is viewed.

* * * * *